United States Patent [19]

McNeil

[11] Patent Number: 5,315,469
[45] Date of Patent: May 24, 1994

[54] MAGNETIC RECORDING HEAD WHICH PRODUCES VARIABLE ERASE BANDS

[75] Inventor: Michael McNeil, Santa Ynez, Calif.

[73] Assignee: Applied Magnetics Corporation, Goleta, Calif.

[21] Appl. No.: 736,449

[22] Filed: Jul. 25, 1991

[51] Int. Cl.[5] .......................... G11B 5/39; G11B 5/23; G11B 5/147

[52] U.S. Cl. .................................. 360/119; 360/113; 360/126

[58] Field of Search .................. 360/57, 66, 118, 119, 360/122, 125, 126, 113

[56] References Cited

U.S. PATENT DOCUMENTS

| | | | |
|---|---|---|---|
| 2,653,189 | 9/1953 | Camras | 360/121 |
| 3,155,949 | 11/1964 | Tibbetts | 360/118 |
| 3,562,443 | 2/1971 | Bos et al. | 360/121 |
| 3,860,958 | 1/1975 | Hanson | 360/57 |
| 4,290,088 | 9/1981 | Beecroft | 360/66 |
| 4,644,421 | 2/1987 | Miwa et al. | 360/66 |
| 4,758,903 | 7/1988 | Noguchi et al. | 360/19.1 |
| 4,774,616 | 9/1988 | Kumasaka et al. | 360/118 |
| 4,935,832 | 6/1990 | Das et al. | 360/113 |
| 4,942,486 | 7/1990 | Kutagari et al. | 360/48 |
| 4,967,298 | 10/1990 | Mowry | 360/121 |
| 5,012,375 | 4/1991 | Nishimura | 360/126 |
| 5,040,087 | 8/1991 | Lee | 360/121 |

OTHER PUBLICATIONS

McWhinney, "Concurrent Write-Tunnel Erase," IBM Tech. Disclosure, vol. 9, No. 7, Dec. 1966, p. 775 in 1 page.
Dawson, "Side Erase Magnetic Head," IBM Tech Disclosure, vol. 8, No. 2, Jul. 1965, p. 220 in 1 page.
Hopkins, "Tunnel Erase Magnetic Transducer," IBM Tech Disclosure, vol. 8, No. 4, Sep. 1965, p. 603 in 1 page.
McClung, "Integral Transverse Margin Erase," IBM Tech Disclosure, vol. 8, No. 8, Jan. 1966, p. 1044 in 1 page.
Aronoff, et al., "Sidewriting Can Create Error Immunity For Disk Drive Designers", Computer Technology Review ®, Fall, 1987.
Chang, et al., "Thin Film Floppy Disk Head", IEEE Transactions on Magnetics, vol. MAG-22, No. 5, Sep., 1986, pp. 695-697.
Feng, "Spin Stand Measurements of Write and Erase Widths", IBM Technical Report, TR02.1610, Dec. 1989.
Feng, "Spin Stand Measurements of Write and Erase Widths", Punlication Information Unknown, pp. 1-9.

*Primary Examiner*—A. J. Heinz
*Assistant Examiner*—Jefferson Evans
*Attorney, Agent, or Firm*—Knobbe, Martens, Olson & Bear

[57] ABSTRACT

The present invention provides a method for producing erase bands of varying width between tracks of information on a recording medium. In accordance with the invention, a magnetic head having a write gap and trailing pole with non-parallel portions is produced. In the preferred embodiment, the magnetic head combines an inductive write head with a magneto-resistive read head in a single head structure. The inductive head includes a leading write pole and a trailing write pole which are separated by a recording gap. The write gap is formed with a central portion writing data in a desired orientation, positioned between two non-parallel side portions having divergent angles with respect to the central portion. In the recording process, the side portions write transitions on the recording medium which are oblique or angled with respect to the data transitions written on the medium by the central portion. These angled transitions produce erase bands between adjacent tracks of information represented by the data transitions recorded by the central portion of the write gap.

The width of the non-parallel side portions is advantageously selected in accordance with the expected servo position error of the drive.

15 Claims, 4 Drawing Sheets

MAGNETIC RECORDING HEAD WHICH PRODUCES VARIABLE ERASE BANDS

FIELD OF THE INVENTION

The present invention relates to magnetic recording heads, and, in particular, to magnetic recording heads which record and read data stored in tracks on a recording medium.

BACKGROUND OF THE INVENTION

In typical magnetic recording systems, data is recorded onto a magnetic medium, such as a tape or a disc, by means of a magnetic recording head housed in a drive. The data is recorded onto the medium in tracks, whose width and spacing determine the density, and thus the amount, of the data which can be recorded onto the medium. The head "reads" data signals from the recording medium having a particular acceptable range of orientation, and disregards signals having an orientation which is sufficiently oblique or angled relative the coherent data signals.

Problems with reading the data recorded on the medium can occur when the drive is subjected to external forces, such as mechanical vibrations resulting from jarring or jolting the drive. In addition, thermal variations within the drive, such as the temperature rise which accompanies warmup, and mechanical and electrical resonances produced by internal mechanisms and circuitry, also produce vibrations within the drive. When such a vibration occurs, the head moves off track and can move partially over other tracks, thereby reading mixed data from the two tracks. In addition, because most drives do not erase unwanted data, but instead, overwrite the existing data with new data, the problem is intensified when the heads write new data over existing data. As will be appreciated, if the recording head is offtrack when overwriting the old data and is later repositioned ontrack to read back the new data, what the head in actuality reads back is a composite of old data signals and new data signals. Since the proper signal on the old data track is the new data signal, the old data signal is considered "coherent noise." Coherent noise is defined as unwanted signals within the bandwidth of the recording code, and is differentiated from broadband thermal noise. Said coherent noise is typically locked in a coherent phase with respect to the desired data signals. If this noise were sufficiently angled from the orientation of the new data signals, it would be disregarded by the head. Unfortunately, all too often the improperly written data is of an orientation similar to that of the desired data track and is mistakenly identified by the head as the desired data signal, or modulates the timing of the desired data signal.

Naturally, vibration during the read operation causes similar problems. That is, even if the data is written on the proper track, vibration will often cause the head to drift partially offtrack during the read operation. Although data is generally written with sufficient density to be read by the head even if the head is partially offtrack, head performance will fall off dramatically if the head picks up sufficient coherent noise from the portions of the recording medium surrounding the desired track. Depending upon track density and the amount of head drift, the coherent noise could include the data from the edge of the adjacent track.

To prevent the head from reading data from two adjacent tracks, areas of the medium, known as guardbands, are commonly positioned between the tracks. Essentially, the guardbands are "strips" of the medium located between information tracks where no data is written. Thus, if the head moves off the desired track during the read operation, no other data from adjacent tracks will be read, and the amount of coherent noise experienced by the head will be drastically reduced.

Guardbands are limited in their capacity to compensate in disc drive failure, however, by their inability to correct for data which has been initially written offtrack. When mechanical vibrations occur which cause the head to move offtrack during the write process, data will be written partially onto the track, as well as onto a portion of the guardband adjacent the track. Later, during the read operation, vibrational head drift will cause the head to read data from both the track and the adjacent guardbands. When the medium is only used for a single write operation, the only coherent data on the guardbands will be the data recorded on the track. When the medium is written over numerous times, the random head drift will cause the guardbands to be filled with a nonsensical combination of misplaced writes and this coherent noise will severely compromise head performance.

To overcome this problem, bands on either side of the information tracks can be erased with each write operation. Because the erase bands are created with each write operation, the bands do not become filled up with misplaced writes and head performance is improved. Some prior art methods of forming erase bands consisted of erasing the data on either side of an information track and then recording data along the track in a separate operation. U.S. Pat. No. 4,644,421 and U.S. Pat. No. 4,290,088 are examples of such methods. While these methods provide for erase bands between adjacent tracks, the process is time consuming and requires multiple operations to achieve erasure.

Magnetic heads have been developed which create erase bands between tracks on the information medium as data is written onto the medium. U.S. Pat. No. 3,155,949 discloses a magnetic transducer assembly comprising a read/write element and an erase element located immediately downstream of the read/write element. The read/write gap and erase gap are of equal widths. However, the erase gap is interrupted by a tunnel or notch. The erase element is activated during the write operation to erase both lateral edges of the written information. This design, however, requires precise and separate machining of the tunnel at increased manufacturing costs so that the desired recording and track widths are obtained.

In the IEEE publication "THIN FILM FLOPPY DISK HEAD", Chang, et al. disclose a magnetic head in which straddle erase of data tracks on a floppy disk is accomplished using the same coil layers as those of the read/write head. As two main pole pieces of the head write data onto the medium, separate erasure poles located on both sides of the write poles write a magnetization pattern which is perpendicular to the direction of the data magnetization. However, this design is also expensive to manufacture due to the extra maskings required to produce the head structure. Further, the width of the erase bands created by this head structure is limited by the width of the gaps between the main write poles and erasure poles.

SUMMARY OF THE INVENTION

The present invention provides a method for producing erase bands of varying width between tracks of information on a recording medium. In the preferred embodiment, the magnetic head combines an inductive write head with a magnetoresistive (MR) read head in a single head structure, which is defined as an integrated MR ("IMR") head. The inductive head includes a leading write pole and a trailing write pole which are separated by a recording or "write" gap. In one embodiment of the head structure, the leading write pole further acts a shield for the MR read head. A second shield is positioned adjacent to the leading write pole, opposite a second and separate read gap and two MR read sensors are positioned between the two shields. The write gap is formed with a central portion positioned between two non-parallel side portions having a divergent angle with respect to the central portion. In the recording process, the side portions write transitions on the recording medium which are oblique or angled with respect to the transitions written on the medium by the parallel central portion. These angled transitions produce erase bands between adjacent tracks of information represented by the normal transitions recorded by the parallel central portion of the write gap.

The width of the non-parallel side portions is advantageously selected in accordance with the expected servo position error of the drive, i.e., the amount by which the head deviates from the track path during the read and write processes. Specifically, by increasing the width of the divergently angled side portions, the width of the erase bands will be increased. During the read process, the information recorded on the medium is read by a read head which is basically insensitive to any portion of the recorded data written angled with respect to the parallel portion of the write gap. Should the head move offtrack during the read process, it will be positioned over the angled transitions written by the non-parallel portions of the write gap, and no coherent noise is read. In this manner, the width of the erase bands formed between adjacent tracks can be varied in accordance with the servo position error rate of the drive, and coherent noise read by the head is minimized. The invention can be applied to various magnetic head configurations including single and dual stripe MR heads with common and separate shields, and inductive heads with a common write and read gap.

BRIEF DESCRIPTION OF THE DRAWINGS

FIGS. 2a through 2g illustrate the fabrication process for the head of FIG. 1;

DETAILED DESCRIPTION OF THE INVENTION

Figure 1:
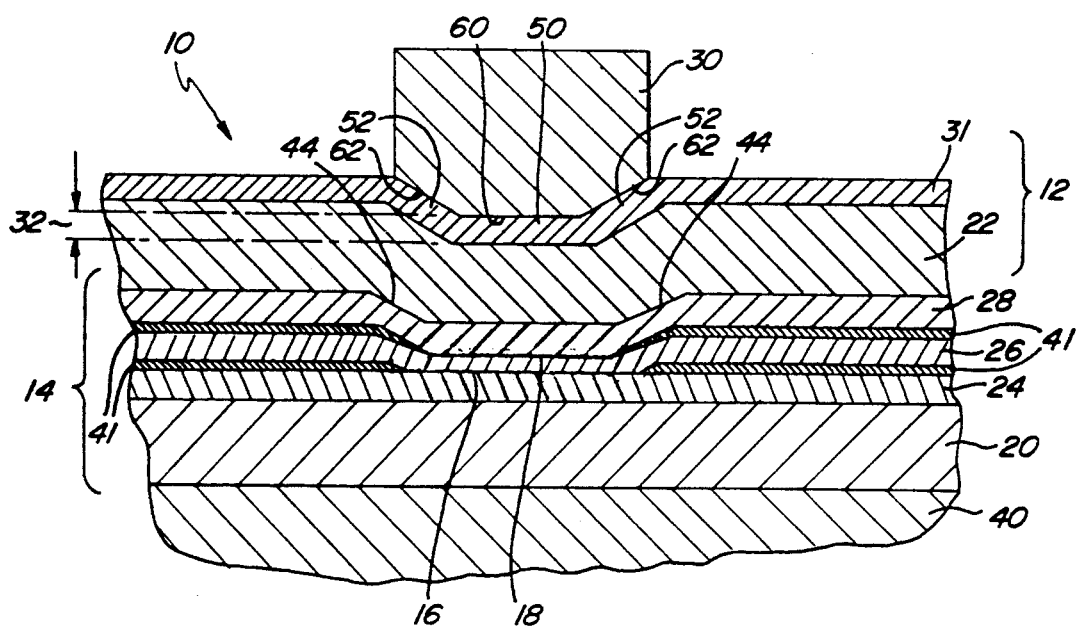
FIG. 1 is a bottom view looking up at a dual stripe IMR head with a common shield constructed in accordance with the present invention.

An IMR head 10 constructed in accordance with the present invention is illustrated in FIG. 1. The read/write head 10 comprises an inductive recording head 12 and a MR read head 14 integrated into a single head structure. The read head 14 includes first and second MR stripe read sensors 16, 18, positioned between first and second MR shields 20, 22. A first layer of insulating material 24 is positioned between the first shield 20 and first sensor 16, and a second layer of insulating material 26 separates the two read sensors 16, 18. A third layer of insulating material 28 is positioned between the second read sensor 18 and second shield 22. The second shield 22 further acts as a leading write pole in the inductive write head 12. The leading pole 22 is separated from a trailing write pole 30 by a fourth layer of insulating material 31 forming a recording or write gap 32.

Figure 2A:
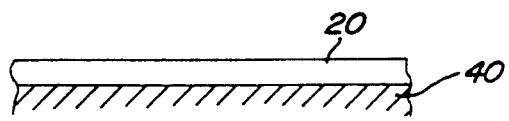
Figure 2B:
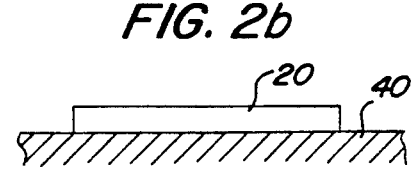
Figure 2C:
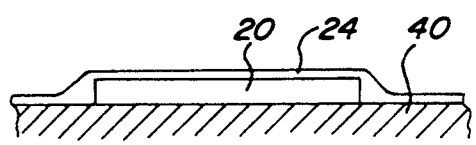
Figure 2D:
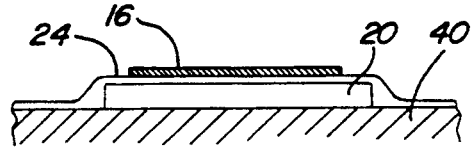

FIGS. 2a through 2f sequentially illustrate the steps followed in producing the IMR head 10 shown in FIG. 1. In the head fabrication process, the first or bottom shield 20 is deposited with a thickness of approximately 2 to 3 $\mu$m upon a base 40, as shown in FIG. 2a, using well known techniques, such as electroplating or sputtering. The bottom shield 20 is then patterned to form the desired shape by conventional techniques, such as ion milling with a photoresist mask, resulting in the configuration shown in FIG. 2b. As illustrated in FIG. 2c, a thin gap layer of $Al_2O_3$ is then sputtered in a thickness of approximately 2,000 Angstroms to form the first insulating layer 24. This insulating layer is termed a "non-magnetic layer," although in reality, as do all materials, it has some magnetic properties. However, relative to the surrounding layers, these magnetic properties are so small that they can be effectively disregarded. Next, the first or bottom MR sensor 16 of NiFe is deposited in a thickness of approximately 300 Angstroms over the first insulating layer 24 and patterned to the desired configuration, shown in FIG. 2d.

Figure 2E:
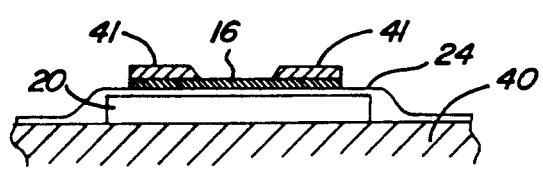
Figure 2F:
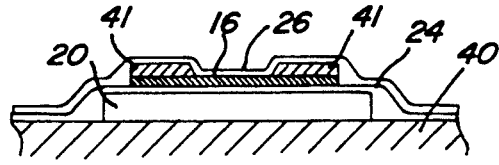
Figure 29:
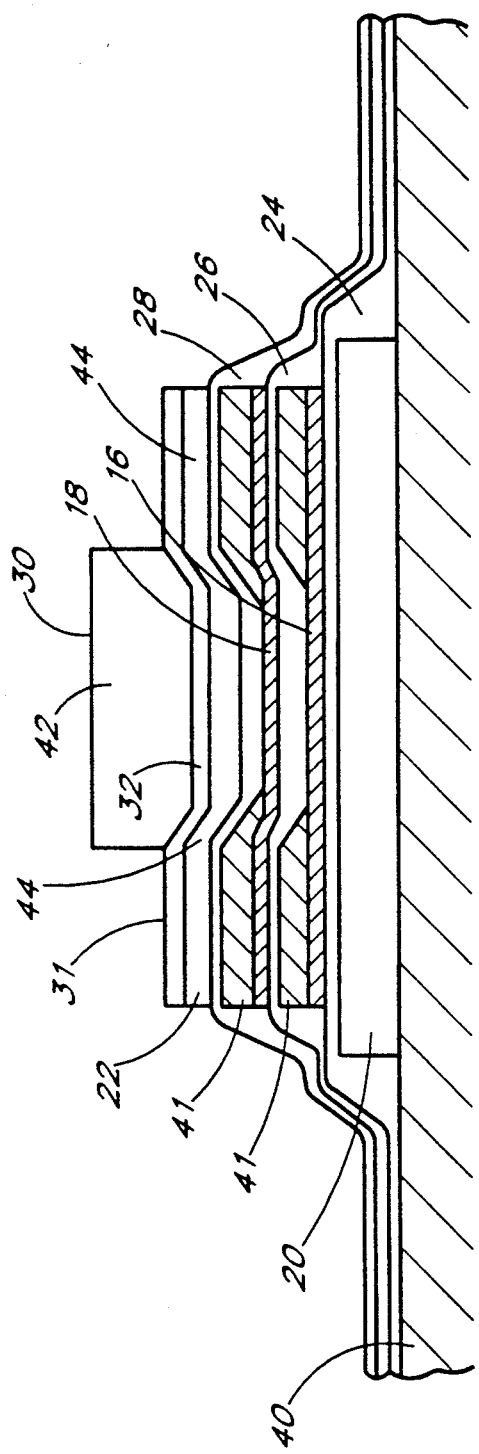

The read sensors 16, 18 typically are provided with leads 41 formed of Ta/Au/Ta which are typically much greater in thickness than the sensors themselves. In accordance with the method of the present invention, the lead 41 associated with the first or bottom sensor 16 is deposited on the bottom sensor and patterned to a thickness of approximately 1,000–1,500 Angstroms as illustrated in FIG. 2e. As will be appreciated by those of skill in the art, the ends of the NiFe layer (which is used to form the first MR sensor) which are covered with Ta/Au/Ta form a portion of the leads. However, because the ends are covered with a relatively thick layer of Ta/Au/Ta, their resistance is much lower than the uncovered portion of the NiFe layer, which forms the MR sensor. After depositing the first lead, a second $Al_2O_3$ gap of approximately 1,000 Angstroms is deposited over the first sensor and leads to form the second insulating layer 26, illustrated in FIG. 2f. Next, the second MR sensor 18 is deposited in a manner identical to that of the first sensor 16 shown in FIG. 2c by depositing a layer of NiFe approximately 300 Angstroms thick, subsequently patterning the layer to the desired configuration and then depositing the desired leads 41. A third gap of $Al_2O_3$ is deposited on the second sensor 18 to a thickness of approximately 2,000 Angstroms to form the third insulation layer 28. The top shield and leading write pole 22, which may be formed of for example, NiFe, is then deposited and patterned.

Due to the topography created by the leads 41, the plated profile of the third insulation layer 28 and shield 22 deposited thereon follow the contour of the underlying structure. Further, the second shield and leading write pole 22 are not planar. Rather, the second shield 22 includes a portion or portion 42 which is parallel to and directly above the read sensors 16, 18, and a portion or portion 44 on each side of the parallel portion 42, above the ends of the leads 41 which mate with the sensors 16, 18 which is not parallel to the sensors 16, 18. This shape is carried through the head structure 10 as the fourth layer of $Al_2O_3$ 31 forming the gap 32 is subsequently deposited on the second shield 22. Lastly, the trailing write pole 30 is deposited using a masking process and is positioned above the gap 32, resulting in the head structure illustrated in FIG. 2g. In this manner, as illustrated in FIG. 1, the recording gap 32 is formed with a central parallel portion or portion 50 located between two outer non-parallel portions or portions 52 having a divergent angle with respect to the parallel portion 50. Further, the trailing pole 30 comprises a parallel portion 60 positioned between two non-parallel angled portions 62.

As will be explained in more detail below, by varying the position and width of the trailing write pole 30 during the deposition process, control over the width of the erase bands subsequently produced by the head in the recording process is realized.

In operation, the magnetic head is carried on a slider which flies above the surface of the recording medium, most commonly, a magnetic disk. The slider is supported by a suspension assembly and positioned over data tracks on the disk by an actuator. Linear actuators hold the slider at a constant, ideally zero skew angle with respect to the disk, while rotary actuators hold the slider at varying skew angles as information tracks on the disk are accessed. Magnetic recording is effected in a well-known manner by applying current to conducting coils enclosing the write poles of the inductive recording head 12. Magnetic flux flows from the trailing write pole 30 to the leading pole 22 across the write gap 32, writing transitions on the portion of the disk positioned beneath the gap 32, i.e., above the plane of the FIG. 1.

Figure 3:
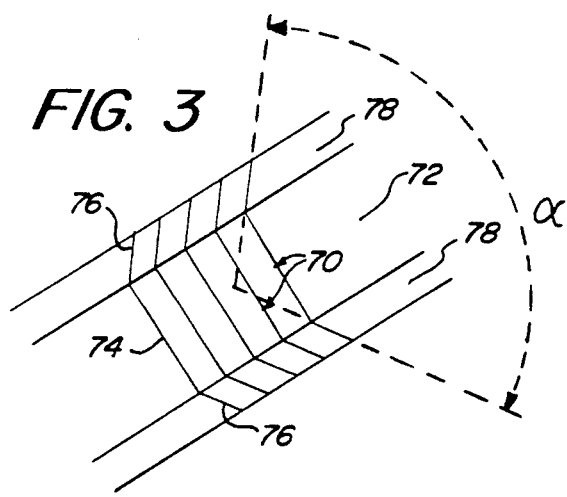
FIG. 3 illustrates the transitions written in an information track in accordance with the present invention.

FIG. 3 illustrates a series of transitions 70 written in an information track 72 by the IMR head 10 shown in FIG. 1. The transitions 70 written on the magnetic medium follow the shape of the gap 32 such that the transitions include a parallel central portion 74 positioned between two angled, or non-parallel portions 76. As those skilled in the art will recognize, the transitions 70 illustrated could be recorded by a head positioned by a linear actuator such that the skew angle of the transitions is zero and the central portions 74 of the transitions are perpendicular to the tangential linear velocity vector or primary direction of motion of the portion of the disk on which the transitions are recorded.

In the case in which the head is carried by a rotary actuator, the head is oriented at a skew angle defined as the angle between the longitudinal axis of the slider and the tangential linear velocity vector or primary direction of motion of the portion of the disk located directly below the slider. Typically, this skew angle varies up to approximately ±20°, depending on the radial position of the slider along the disk and the overall drive geometry. The central portions of the transitions written in the information track on a given portion of the disk by a head carried on a rotary actuator are thus written in a skewed direction on the information track at an oblique angle with respect to the primary direction of motion of that portion wherein the oblique angle equals 90° ± the skew angle of the head. As will be appreciated by those skilled in the art, when the head is then positioned over the disk to read the recorded data transitions, the slider assumes the same skew angle as when the data transitions were written, such that the central portions of the transitions are read and the non-parallel portions of the data transitions, written at divergent angles with respect to the oblique angle of the central portions, are not read by the head in any position other than the precise position in which they were written.

The width of the parallel central portion 50 of the gap 32 is selected in accordance with the desired track width such that the parallel portions 74 of the transitions 70 fill the entire width and are recorded in the desired track 72 when the head is optimally positioned over the desired track 72 during the recording process. The non-parallel or angled portions 52 of the gap 32 then write non-parallel or angled transitions 76 at the track edges, which, as will be explained in detail below, form an erase band 78 at the edges of the track 72.

During the read process, the read sensors 16, 18 are optimally positioned over and in alignment with the desired information track 72, so as to read the parallel transitions 70 written therein. In actuality, however, many situations occur during the read and write processes which produce vibrations that can move the read head 14 and associated sensors 16, 18 out of alignment with the track 72. In this situation, the head 14 would be positioned over a portion of the information track 72 containing the parallel transitions 70, and over a portion of the erase band 78 containing the non-parallel transitions 76. Because the read sensors 16, 18 are relatively insensitive to data which is recorded at an angle with respect to the parallel portion 50 of the gap 32, the non-parallel transitions 76 at the track edges are not read. Thus, if the head 14 is positioned outside the track 72 during the read or write processes, the non-parallel transitions 76 will not be acknowledged and no off-track signal is read. It can be seen that the non-parallel transitions 76 will in fact effectively over-write older, misplaced data signals, thereby creating an effective guardband equal in width to the erase band 78.

Referring to FIGS. 1 and 3, the width of the written track 72 directly corresponds to the width of the parallel portions 60, 50 of the trailing write pole 30 and gap 32, respectively, while the read width corresponds to the width of the two read sensors 16, 18. In accordance with the invention, the width of the non-parallel portions 62 of the trailing write pole 30 is selected to equal the width of the erase band 78 desired between adjacent information tracks on the medium. This "width" is measured along a line parallel to the parallel portions 60, 50 of the parallel write pole and gap. Preferably, the width of the erase band 78 between tracks corresponds to the expected 3σ servo position error of the drive. Because the servo position error varies from drive to drive, the magnetic head of the present invention enables the width of the erase band 78 to be tailored to the servo position error conditions expected in any drive. Thus, in drives with little servo position error, the width of the non-parallel portions 62 of the trailing write pole 30 is decreased such that the width of the erase band 78 between adjacent tracks is reduced and track density is increased. Conversely, if a drive has high servo position error either due to drive design or expected operating conditions, the width of the non-parallel portions 62 is increased, creating wider erase bands.

It will further be appreciated by those skilled in the art that the above-described read/write head 10 produces write tracks which are optimally aligned with the read tracks. Because the trailing write pole is not deposited onto a planar surface, but rather, onto the shaped surface of the gap layer 31, any misalignment during the deposition process will only result in a shift of the non-parallel portions of the trailing pole 30. This shift will result in one erase band being wider than the other; however, the write width will remain substantially equal to and aligned with the read width.

In an additional aspect of the invention, a single stripe IMR head with the advantages of the present invention could be produced by depositing only one MR sensor 16 upon the first insulating layer 24 and shield 20, and then subsequently depositing the second insulating layer 26, the leading write pole and top shield 22, the insulating layer 31 forming the gap 32 and trailing pole 30 in a manner identical to that described above in connection with FIGS. 2a through 2g.

Figure 4:
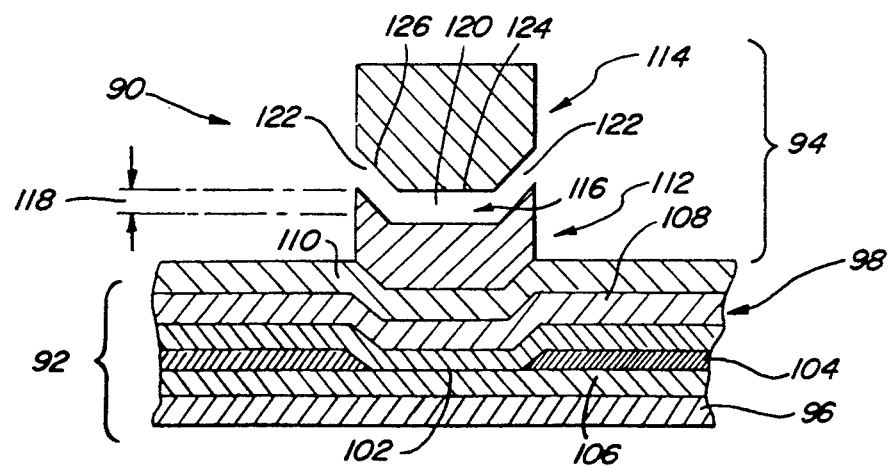
FIG. 4 is a bottom view looking up at an IMR head having separated the write pole and read shield, constructed in accordance with the present invention.

A further embodiment of a read/write IMR head 90 in accordance with the invention is illustrated in FIG. 4. The read/write IMR head 90 comprises, for example, a single stripe MR head 92 which reads information recorded onto a desired data track on an information medium and a separated inductive write head 94 which writes or records data onto the medium. The MR head 92 comprises a first or bottom shield 96 and a second or top shield 98. An MR sensor 102 is positioned between the shields 96, 98 and leads 104 are deposited onto the ends of the sensor 102. A first layer of insulating material 106 is positioned between the bottom shield 96 and the sensor 102, and a second layer of insulating material 108 is positioned between the sensor 102 and leads 104 and the top shield 98. The MR read head 92 is separated from the inductive write head 94 by a third insulating layer 110. The write head 94 includes a leading pole 112 and a trailing pole 114 which are separated by a layer of insulation 116 forming a recording gap 118.

The MR head is constructed by sequentially depositing the bottom shield 96, the first insulating layer 106, the MR sensor 102, the leads 104, the second insulating layer 108, and the top shield 98. Next, the third insulating layer 110 is deposited on the top shield 98. The materials, thicknesses, and processes for the deposition and layers are identical to those previously described in connection with FIGS. 2a through 2g.

The read/write IMR head 90 is completed by depositing the leading write pole 112, gap layer 116, and trailing write pole 114 using conventional masking and deposition techniques. The leading write pole and trailing write pole are preferably formed of NiFe deposited in layers of approximately 3 $\mu$m each. The gap layer 116 preferably comprises $Al_2O_3$ having a thickness of approximately 0.4–1.0 $\mu$m, but is not limited to this range of thickness.

Because the thickness of the leads 104 is carried through the head structure in the fabrication process, the gap is formed with a central parallel portion 120 positioned directly over the sensor 102, and two non-parallel portions 122 on each side of the parallel portion, above the leads 104. Similarly the trailing write pole 114 is formed with a central parallel portion 124 positioned between two non-parallel portions 126. The non-parallel write gap produces transitions 76 as shown in FIG. 3 so as to create erase bands 78 at each side of the recorded information track 70. As in the previously described embodiments, the width of the erase bands 78 may be tailored by varying the position and width of the trailing pole 114 with respect to the gap 118 to provide erase bands 78 which correspond to the expected servo position error in any drive.

The included angle between the extension of the sides of the non-parallel side portions of the trailing write poles can be in the range of 0° to 174° and is desirably in the range of 90° to 160° and is preferably approximately 140°. At 0°, the first and second non-parallel portions are parallel with respect to each other and their width is equal to the thickness of the non-magnetic gap layer. With the head structures illustrated in FIG. 1, FIG. 2 and FIG. 4, the angle can be adjusted by varying the thickness of the leads associated with the read sensor(s). The included angle between the non-parallel side portions of the recording gap can create the desired erase bands even if the angle between the left non-parallel portion (as shown in FIG. 1) and the parallel portion is not equal to the angle between the right non-parallel portion (as shown in FIG. 1) and the parallel portion, regardless of embodiment.

Figure 6:
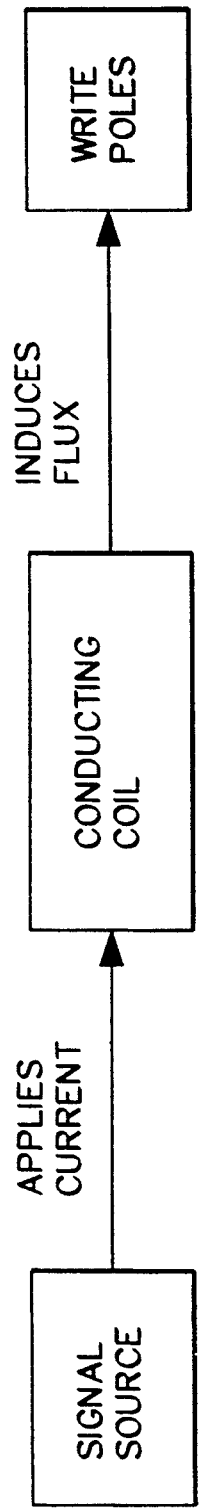

Those skilled in the art will recognize that erase bands produced in accordance with the present invention maximize drive performance and minimize bit shift and error rates. FIG. 6 illustrates a track and erase profile for a magnetic head constructed in accordance with the present invention having a track width of approximately 8 $\mu$m, an erase band width of approximately 2 $\mu$m, and an included angle $\alpha$ (as shown in FIG. 3) of approximately 140° between the non-parallel portions of the gap. The figure illustrates a first curve 127 representing the signal response of a selected information track and a second curve 128 representing the signal response of tracks previously written, and adjacent to, each side of the selected track. As expected, the signal amplitude of the data on the information track is strongest at the center of the track (0 $\mu$m offtrack) and decreases as the distance from the track center increases. The second curve, however, includes a generally flat portion 129, which extends approximately 2 $\mu$m on each side of the track center. This flat portion 129 indicates that essentially no appreciable noise is read until the head moves more than approximately 2 $\mu$m off the center of the selected data track. Thus, an erase band exists on either side of the information track to advantageously ensure that no noise from adjacent tracks is read when the head moves offtrack.

While the present invention has been described above in reference to a magneto-resistive magnetic head, it will be apparent to those skilled in the art that the principles of the invention could be applied to other types of recording heads by producing a write gap which has non-parallel portions with respect to the track edges. For example, the inductive write heads shown as 12 in FIG. 1 and 94 in FIG. 4, if employed as inductive read/write heads, would achieve similar advantages due to the controlled variation in erase band width.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to embraced within their scope.

What is claimed is:

1. A magnetic recording system for recording data onto a track of a magnetic medium, said magnetic recording system comprising:

a magnetic recording head, comprising:
  a leading pole defining a first portion, a second portion and a third portion, said second portion being positioned between said first portion and said third portion, wherein said first portion, said second portion and said third portion form a single continuous magnetic layer;
  a trailing pole defining a fourth portion, a fifth portion and a sixth portion, wherein said fourth portion, said fifth portion and said sixth portion form a single continuous magnetic layer and wherein further said fourth portion opposes and is parallel to said first portion, said fifth portion writing data in said desired orientation opposes and is parallel to said second portion and said sixth portion opposes and is parallel to said third portion and wherein further said fifth portion and said second portion cooperate to write transitions on said magnetic medium, said fourth portion and said first portion cooperate to write transitions on said magnetic medium which are non-parallel to said transitions written by said fifth portion and said second portion and said sixth portion and said third portion cooperate to write transitions on said magnetic medium which are non-parallel to said transitions written by said fifth portion and said second portion; and
  a non-magnetic layer between said trailing pole and said leading pole;
  a conducting coil enclosing one of said poles; and
  a signal source connected to said coil to energize said coil to simultaneously cause said fifth portion to cooperate with said second portion to write data, and said fourth portion to cooperate with said first portion and said sixth portion to cooperate with said third portion to write transitions which are non-parallel to said transitions written by said fifth portion and said second portion.

2. The magnetic recording head of claim 1, wherein the angle between said first portion and said third portion are between 0° and 174°.

3. The magnetic recording head of claim 1, wherein the angle between said first portion and said third portion are between 90° and 160°.

4. A magnetic recording system for recording data in a desired orientation on a recording medium, said system comprising:
  a magnetic recording head, comprising:
    a leading pole defining a first generally planar surface, a second generally planar surface and a third generally planar surface, wherein said second surface adjoins, is positioned between and forms a continuous magnetic layer with said first surface and said third surface; and
    a trailing pole defining a fourth generally planar surface, a fifth generally planar surface writing data in a desired orientation and a sixth generally planar surface, wherein said fifth surface adjoins, is positioned between and forms a continuous magnetic layer with said fourth surface and said sixth surface and wherein further said fourth surface opposes and is generally parallel to said first surface, said fifth surface opposes and is generally parallel to said second surface and said sixth surface opposes and is generally parallel to said third surface and wherein further said second surface is perpendicular to said desired orientation and said first and third surfaces are non-parallel to said second surface; and
    a non-magnetic layer between said trailing pole and said leading pole;
  a conducting coil enclosing one of said poles; and
  a signal source connected to said coil to energize said coil to simultaneously cause said fifth surface to cooperate with said second surface to write data, and said fourth surface to cooperate with said first surface and said sixth surface to cooperate with said third surface to write transitions which are non-parallel to said transitions written by said fifth surface and said second surface.

5. The magnetic recording head of claim 4, wherein the angle between said first surface and said third surface are between 0° and 174°.

6. The magnetic recording head of claim 4, wherein the angle between said first surface and said third surface are between 90° and 160°.

7. A magnetic recording system for recording data on a magnetic medium wherein the system has a maximum expected servo position error, comprising:
  a magnetic recording head, comprising:
    a leading pole defining a first portion, a second portion and a third portion, said second portion being positioned between said first portion and said third portion, wherein said first portion, said second portion and said third portion form a single continuous magnetic layer;
    a trailing pole defining a fourth portion, a fifth portion and a sixth portion, wherein said fourth portion, said fifth portion and said sixth portion form a single continuous magnetic layer and wherein further said fourth portion opposes and is parallel to said first portion, said fifth portion writing data in said desired orientation opposes and is parallel to said second portion and said sixth portion opposes and is parallel to said third portion and wherein further said fifth portion and said second portion cooperate to write transitions on said magnetic medium, said fourth portion and said first portion cooperate to write transitions on said magnetic medium which are non-parallel to said transitions written by said fifth portion and said second portion and said sixth portion and said third portion cooperate to write transitions on said magnetic medium which are non-parallel to said transitions written by said fifth portion and said second portion, wherein the width of said non-parallel portion sis roughly equal to or greater than said maximum expected servo position error of said system; and
    a non-magnetic layer between said trailing pole and said leading pole;
  a conducting coil enclosing one of said poles; and
  a signal source connected to said coil to energize said coil to simultaneously cause said fifth portion to cooperate with said second portion to write data, and said fourth portion to cooperate with said first portion and said sixth portion to cooperate with said third portion to write transitions which are non-parallel to said transitions written by said fifth portion and said second portion.

8. The magnetic recording head of claim 7, wherein the width of said non-parallel portions is roughly equal to said maximum expected servo position error.

9. A magnetic read/write head for reading data recorded on and writing data onto a magnetic medium, comprising:
   a read head for reading data recorded on a magnetic medium, comprising:
      a leading magnetic shield layer;
      a magnetoresistive sensor; and
      a non-magnetic layer; and
   a write head for writing data on a recorded medium, comprising:
      a continuous leading magnetic write pole, which is also a trailing shield for said read head, comprising a center portion and extension portions that are non-parallel to said center portion;
      a continuous non-magnetic gap layer adjacent said leading write pole comprising portions parallel to each adjacent portion of said leading write pole; and
      a continuous trailing write pole comprising portions parallel to each adjacent portion of said non-magnetic gap layer.

10. The magnetic read/write head of claim 9, wherein center and extension portions of said trailing write pole are formed from a single continuous magnetic layer.

11. The magnetic read/write head of claim 10, wherein center and extension portions of said leading write pole are formed from a single continuous magnetic layer.

12. A magnetic read/write head for a read/write system for reading data recorded on and writing data onto a magnetic medium wherein said system has a maximum expected servo position error, comprising:
   a read head for reading data recorded on a magnetic medium, comprising:
      a leading magnetic shield layer;
      a magnetoresistive sensor;
      a trailing magnetic shield layer; and
      a non-magnetic layer; and
   a write head for writing data on a recorded medium, comprising:
      a continuous leading magnetic write pole comprising a center portion and extension portions that are non-parallel to said center portion;
      a continuous non-magnetic gap layer comprising portions parallel to each adjacent portion of said leading write pole; and
      a continuous trailing write pole comprising portions parallel to each adjacent portion of said non-magnetic gap layer.

13. The magnetic read/write head of claim 12, wherein the width of said non-parallel extension portions are roughly equal to said expected servo position error of said system.

14. A magnetic head for reading and writing data on the surface of a magnetic medium, said magnetic head comprising:
   an inductive write head comprising a leading pole and a trailing pole separated by a recording gap, wherein said gap and said trailing pole include a first portion for writing data in a desired orientation positioned between second and third portions, wherein said second and third portions are angled with respect to said first portion, said inductive head recording data transitions onto said medium in response to a magnetic field established across said recording gap wherein said data transitions include a first portion positioned between second and third portions, wherein said second and third portions of said transitions are angled with respect to said first portion of said transitions; and
   a magneto-resistive read head comprising a plurality of read sensors, wherein said sensors are insensitive to said second and third portions of said data transitions.

15. An inductive read/write head in which both write and read processes are performed by a common gap, comprising:
   a continuous recording gap layer deposited over a leading pole which has been formed to create extension portions non-parallel to a central portion of the recording gap layer;
   a continuous trailing pole over said gap layer, which trailing pole defines a central portion parallel to the central portion of the recording gap layer and extension portions parallel to said extension portions of the recording gap layer;
   said central portions provided with constant length dimensions regardless of an alignment of said leading and trailing poles; and
   said extension portion dimensions are determined by trailing pole width.

* * * * *

UNITED STATES PATENT AND TRADEMARK OFFICE
CERTIFICATE OF CORRECTION

PATENT NO. : 5,315,469

DATED : May 24, 1994

INVENTOR(S) : Michael McNeil

Figure 5:
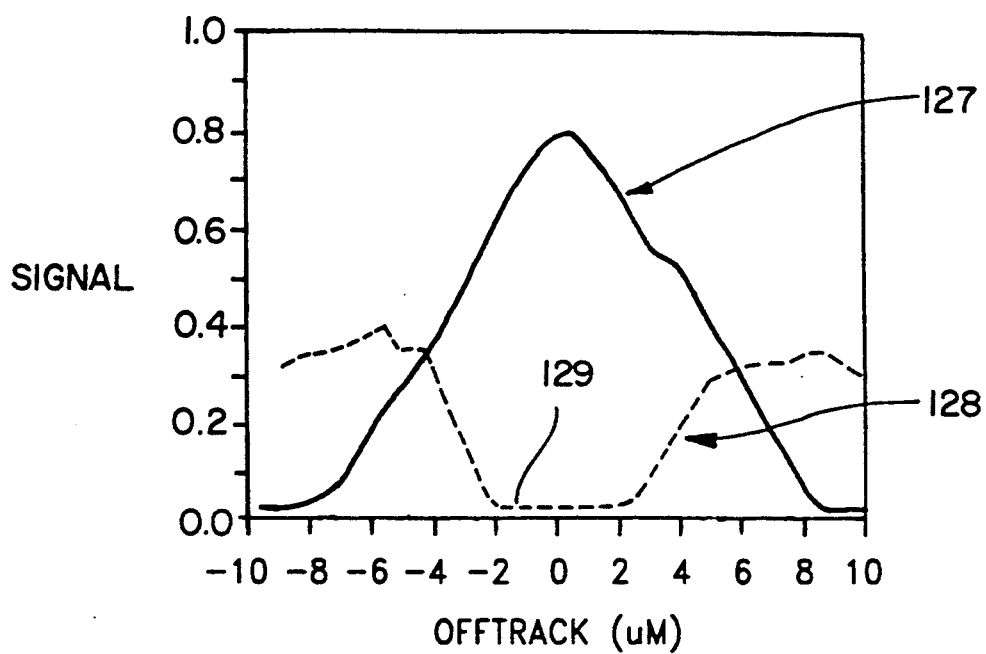
FIG. 5 is a track and erase profile illustrating the signal-to-noise ratio of a head of the type shown in FIG. 1 produced in accordance with the present invention.

It is certified that error appears in the above-indentified patent and that said Letters Patent is hereby corrected as shown below:

Column 8, Line 23, change "FIG. 6" to --FIG. 5--

Signed and Sealed this

Twelfth Day of November, 1996

Attest:

BRUCE LEHMAN

*Attesting Officer*              *Commissioner of Patents and Trademarks*